(12) United States Patent
Powell

(10) Patent No.: US 9,949,437 B2
(45) Date of Patent: Apr. 24, 2018

(54) COOLING SYSTEM FOR A HARVESTER

(71) Applicant: DENSO International America, Inc., Southfield, MI (US)

(72) Inventor: Patrick Powell, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 126 days.

(21) Appl. No.: 15/135,030

(22) Filed: Apr. 21, 2016

(65) Prior Publication Data

US 2017/0303472 A1 Oct. 26, 2017

(51) Int. Cl.
*A01F 12/56* (2006.01)
*F01P 3/20* (2006.01)
*A01F 12/00* (2006.01)
*A01D 34/04* (2006.01)

(52) U.S. Cl.
CPC .............. *A01F 12/56* (2013.01); *F01P 3/20* (2013.01); *A01D 34/04* (2013.01); *A01F 12/00* (2013.01)

(58) Field of Classification Search
CPC .......... A01F 12/00; A01F 12/56; A01F 12/48; F01P 3/20; A01D 34/04; A01D 41/133
See application file for complete search history.

(56) References Cited

U.S. PATENT DOCUMENTS

| | | | | |
|---|---|---|---|---|
| 1,658,775 A * | 2/1928 | Campbell | ................ | A01F 12/46 34/182 |
| 2,465,070 A * | 3/1949 | Demuth | ................ | A01D 41/133 34/60 |
| 2,537,186 A * | 1/1951 | Everett | ................ | A01D 41/133 34/129 |
| 3,096,165 A * | 7/1963 | Lane | .................... | A01D 41/133 34/183 |
| 3,581,407 A * | 6/1971 | Ward | ..................... | F26B 17/22 34/166 |
| 4,209,918 A * | 7/1980 | Klein | ................... | A01D 41/133 34/182 |
| 5,156,570 A * | 10/1992 | Justice, III | ........... | A01D 41/133 34/180 |
| 6,029,367 A * | 2/2000 | Moody | ................. | F26B 21/001 237/1 R |
| 6,216,778 B1 | 4/2001 | Corwin et al. | | |
| 6,536,133 B1 * | 3/2003 | Snaper | ...................... | A23B 9/04 219/698 |
| 8,046,877 B2 * | 11/2011 | Nimmo | ................. | A01D 46/08 19/48 R |
| 9,696,089 B2 * | 7/2017 | Kim | ..................... | A01D 41/133 |
| 2010/0307120 A1 * | 12/2010 | Stover | ................... | A01D 46/08 56/28 |
| 2011/0197558 A1 * | 8/2011 | Nimmo | ................. | A01D 46/08 56/12.2 |

(Continued)

FOREIGN PATENT DOCUMENTS

JP 2009115712 A 5/2009

*Primary Examiner* — Alicia Torres
*Assistant Examiner* — Adam J Behrens
(74) *Attorney, Agent, or Firm* — Harness, Dickey & Pierce, P.L.C.

(57) ABSTRACT

A cooling system for a crop harvester. The cooling system includes a thermal transfer system configured to transfer heat from an engine of the crop harvester to air and crops passing through a crop chute of the crop harvester to cool the engine and dry crops passing through the crop chute.

10 Claims, 2 Drawing Sheets

(56) References Cited

U.S. PATENT DOCUMENTS

2015/0026992 A1* 1/2015 Kim .................... A01D 41/133
34/86
2017/0006764 A1* 1/2017 Farley .................... A01B 76/00

* cited by examiner

COOLING SYSTEM FOR A HARVESTER

FIELD

The present disclosure relates to a cooling system for a harvester, the cooling system configured to, for example, cool the harvester's engine and dry crops being harvested.

BACKGROUND

This section provides background information related to the present disclosure, which is not necessarily prior art.

Combine harvesters typically harvest and process grain crops by separating grain seeds from chaff and other byproducts, which are generally unusable portions of the grain crops. The byproducts are typically discarded from the harvester and returned to the field for use as mulch. In some instances, the byproducts undesirably re-enter the harvester through cooling inlets of the harvester, and may block the cooling inlets, thus restricting airflow therethrough. As a result, the engine cooling system of the harvester becomes less effective.

While current harvester cooling systems are suitable for their intended use, they are subject to improvement. For example, it would be advantageous to have a harvester cooling system that does not rely on airflow passing through an inlet, which may be blocked by harvesting byproducts. A crop harvester that can efficiently dry harvested grain seeds would also be desirable. The present teachings include a cooling system that exhibits such advantages, as well as numerous others as will be apparent to one skilled in the art.

SUMMARY

This section provides a general summary of the disclosure, and is not a comprehensive disclosure of its full scope or all of its features.

The present teachings provide for a cooling system for a crop harvester. The cooling system includes a thermal transfer system configured to transfer heat from an engine of the crop harvester to air and crops passing through a crop chute of the crop harvester to cool the engine and dry crops passing through the crop chute.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
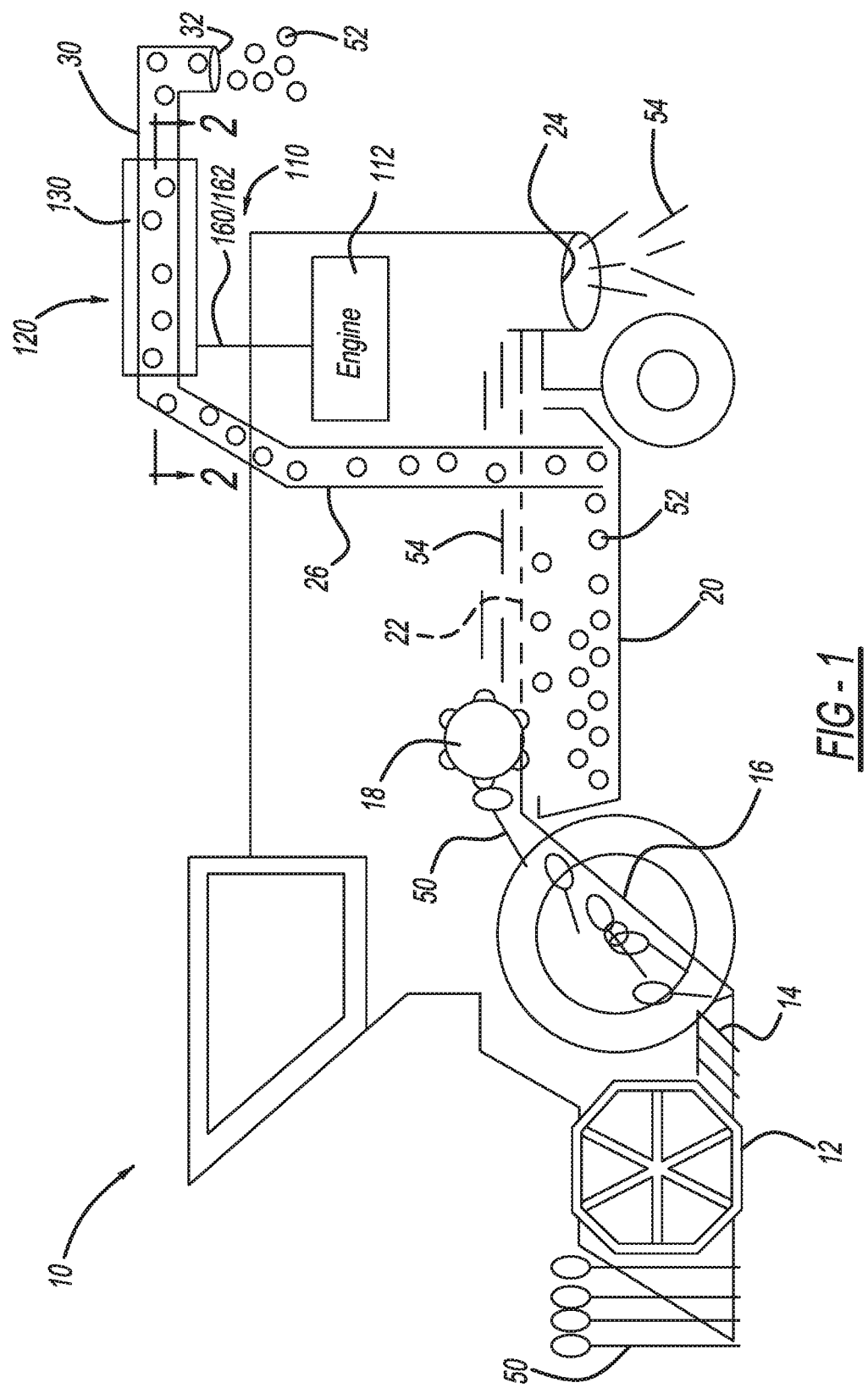
Figure 2:
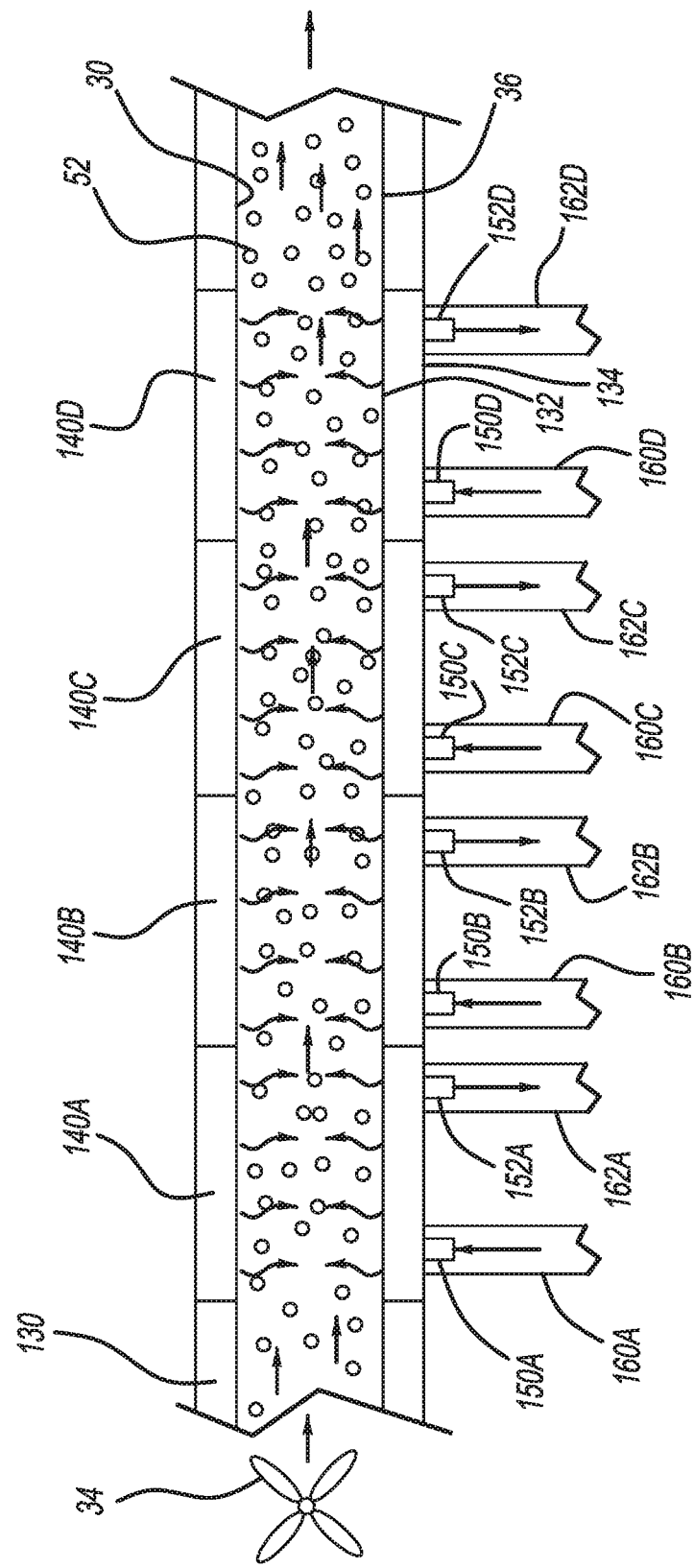

FIG. 1 illustrates a crop harvester including a crop cooling system according to the present teachings; and FIG. 2 is a cross-sectional view taken along line 2-2 of FIG. 1 of a crop chute including a thermal transfer jacket according to the present teachings.

Corresponding reference numerals indicate corresponding parts throughout the several views of the drawings.

DETAILED DESCRIPTION

Example embodiments will now be described more fully with reference to the accompanying drawings.

With initial reference to FIG. 1, a crop harvester is illustrated at reference numeral 10. The crop harvester 10 can be any suitable harvester configured for harvesting any suitable crops, such as grain crops. The crop harvester 10 of FIG. 1 is merely an exemplary crop harvester as the present teachings apply to any suitable crop harvester.

The exemplary crop harvester 10 of FIG. 1 includes a pickup reel 12, which rotates to direct crops to a cutter bar 14. Thus in the example illustrated, the pickup reel 12 is configured to direct crops 50, such as grain crops, to the cutter bar 14, which cuts the grain crops 50 from the ground. The grain crops 50 can be any suitable grain crops, such as wheat, oats, rye, barley, corn, soybeans, flax, sunflowers, canola, etc.

After being cut, the crops 50 are transported by a conveyer 16 to a threshing drum 18. The threshing drum 18 is arranged proximate to a collecting tank 20. A sieve 22 is included with the collecting tank 20, or arranged as a separate member between the collecting tank 20 and the threshing drum 18.

The threshing drum 18 beats the cut grain crops 50 to break and shake seeds 52 therefrom. The sieve 22 is sized and shaped to allow seeds 52 to pass therethrough and into the collecting tank 20. The portions of the grain crops 50, other than the seeds 52, such as the chaff, stem, and other byproducts, which are collectively illustrated at reference numeral 54, are too large to pass through the sieve 22. The byproducts 54 are instead transported to an outlet 24 of the harvester 10 in any suitable manner. The byproducts 54 are dispensed from the outlet 24 back to the field from which the grain crops 50 were harvested, and can be used as mulch for example.

Seeds 52 collected in the collecting tank 20 are transported out from within the collecting tank 20 in any suitable manner, such as by elevator 26. The grain seeds 52 are transported to a crop chute 30, which defines an outlet 32 at a distal end thereof. The grain seeds 52 are blown through the crop chute 30, such as by a blower 34 (FIG. 2), and are dispensed out from within the crop chute 30 through the outlet 32 into any suitable collection bin, such as into a trailer pulled by a tractor driving alongside the crop harvester 10.

The crop harvester 10 includes a cooling system 110 according to the present teachings, which is configured to cool an engine 112 of the harvester 10. The engine 112 propels the crop harvester 10, and can run any other suitable components of the crop harvester 10. The cooling system 110 includes a thermal transfer system 120, which is configured to transfer heat from the engine 112 to air and grain seeds 52 passing through the crop chute 30.

With continued reference to FIG. 1, and additional reference to FIG. 2, the thermal transfer system 120 includes a jacket 130, which extends around the crop chute 30. Specifically, and with reference to FIG. 2, the crop chute 30 includes an outer wall 36. An inner wall 132 of the jacket 130 is arranged to abut, or closely abut, the outer wall 36 so as to permit thermal transfer between liquids circulating through the jacket 130 and both air and grain seeds 52 passing through the crop chute 30, as will now be described in detail.

Opposite to the inner wall 132 of the jacket 130 is an outer wall 134. Defined between the inner and outer walls 132 and 134 are a plurality of chambers configured to allow fluid to circulate therethrough, and thus circulate fluid around the crop chute 30. Any suitable number of chambers can be included, such as one chamber or more than one chamber. In the example of FIG. 2, four chambers are included: a first chamber 140A, a second chamber 140B, a third chamber 140C, and a fourth chamber 140D.

Each one of the chambers 140A-140D is separate from one another, such that fluid cannot pass between different chambers 140A-140D. Each one of the chambers 140A-140D includes a fluid inlet 150A, 150B, 150C, and 150D respectively, as well as a fluid outlet 152A, 152B, 152C, and 152D respectively. Each one of the fluid inlets 150A, 150B, 150C, and 150D is coupled to an inlet conduit 160A, 160B, 160C, and 160D respectively. Each one of the fluid outlets 152A, 152B, 152C, and 152D is coupled to an outlet conduit 162A, 162B, 162C, and 162D respectively. The inlet conduits 160A-160D are configured to convey relatively warm fluid to the jacket 130 from the engine 112, any components associated with the engine 112, or any other components of the crop harvester 10 to be cooled. The outlet conduits 162A-162D are configured to transport the fluids back to their origin, such as back to the engine 112, after the fluids have circulated through the chambers 140A-140D, and after heat of the fluids has been transferred to grain seeds 52 and air passing through the crop chute 30, thereby cooling the fluids, drying the grain seeds 52, and heating the air.

The conduits 160A, 160B, 160C, 160D, 162A, 162B, 162C, and 162D (generally illustrated in FIG. 1 at 160 and 162), can be arranged to transfer any suitable fluids to the jacket 130. For example, inlet conduit 160A and outlet conduit 162A can be arranged to transfer radiator fluid to and from the first chamber 140A. Inlet conduit 160B and outlet conduit 162B can be arranged to transfer engine oil to and from the second chamber 140B. The inlet conduit 160C and the outlet conduit 162C can be arranged to transfer charge air cooler (CAC) fluid to and from the third chamber 140C. The inlet conduit 160D and the outlet conduit 162D can be arranged to transfer any suitable hydraulic fluid to and from the fourth chamber 140D.

Circulating heated fluids through the chambers 140A-140D transfers heat to the grain seeds 52 and air flowing through the crop chute 30, thereby advantageously cooling the fluids and drying the grain seeds 52. Such thermal transfer at the jacket 130 advantageously cools the engine 112, as well as any other components of the crop harvester 10 of which fluid thereof is circulated through the jacket 130. Therefore, the crop harvester 10 need not include a large air intake vent at an exterior thereof for cooling, which can be disadvantageously clogged with byproducts 54 of the collected grain crops 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cooling system for a crop harvester comprising:
   a thermal transfer system configured to transfer heat from an engine of the crop harvester to air and crops passing through a crop chute of the crop harvester to cool the engine and dry crops passing through the crop chute;

wherein:
the thermal transfer system includes a jacket extending around the crop chute, the jacket defining a plurality of chambers configured to transfer heat from fluids within the chambers to air and crops passing through the crop chute;
at least some of the fluids within the chambers have been heated by the engine;
a plurality of conduits extend to the crop chute, the plurality of conduits configured to transport the fluids to the chambers of the jacket; and
each one of the chambers includes an inlet port and an outlet port.

2. The cooling system of claim 1, wherein the plurality of chambers include: a first chamber in receipt of radiator fluid; a second chamber in receipt of oil; a third chamber in receipt of charge air cooler fluid; and a fourth chamber in receipt of hydraulic fluid.

3. The cooling system of claim 1, wherein the jacket includes an inner wall directly abutting an outer surface of the crop chute to permit heat transfer therebetween.

4. A cooling system for a crop harvester comprising:
a jacket surrounding a crop chute of the crop harvester; and
at least one conduit configured to transport fluid heated by an engine to the jacket;
wherein the jacket is configured to permit heat transfer from fluid within the jacket to air and crops passing through the crop chute to cool the engine of the crop harvester and dry crops passing through the crop chute; and
wherein the jacket defines a plurality of chambers, each one of the plurality of chambers is configured to receive a different fluid.

5. The cooling system of claim 4, wherein each one of the plurality of chambers includes an inlet port and an outlet port having a conduit attached thereto.

6. The cooling system of claim 4, wherein the plurality of chambers includes: a first chamber in receipt of radiator fluid; a second chamber in receipt of oil; a third chamber in receipt of charge air cooler fluid; and a fourth chamber in receipt of hydraulic fluid.

7. The cooling system of claim 4, wherein the jacket includes an inner wall directly abutting an outer surface of the crop chute.

8. A method for cooling an engine of a crop harvester and drying crops harvested therewith, the method comprising:
transferring heat from the engine to air and crops passing through a crop chute of the crop harvester to cool the engine and dry crops passing through the crop chute;
directing fluids heated by the engine to a jacket surrounding the crop chute, the jacket configured to transfer heat from fluids to air and crops passing through the crop chute; and
directing different fluids to different chambers defined by the jacket, each one of the chambers including an inlet port and an outlet port.

9. The method of claim 8, further comprising directing radiator fluid to a first chamber of the jacket, directing oil to a second chamber of the jacket, directing charge air cooler fluid to a third chamber of the jacket, and directing hydraulic fluid to a fourth chamber of the jacket.

10. The method of claim 8, wherein the jacket is arranged such that an inner wall of the jacket directly abuts an outer surface of the crop chute.

* * * * *